(12) United States Patent
Scherz et al.

(10) Patent No.: US 11,019,826 B2
(45) Date of Patent: Jun. 1, 2021

(54) SYSTEM AND METHODS OF CUTTING AND PACKAGING TORTILLAS

(71) Applicant: ASA Food Equipment, Inc., Orange, CA (US)

(72) Inventors: Peter Alan Scherz, Orange, CA (US); Kyle Alan Armstrong, Tustin, CA (US); Christopher Michael Armstrong, Orange, CA (US)

(73) Assignee: ASA Food Equipment, Inc., Orange, CA (US)

( * ) Notice: Subject to any disclaimer, the term of this patent is extended or adjusted under 35 U.S.C. 154(b) by 0 days.

(21) Appl. No.: 16/245,899

(22) Filed: Jan. 11, 2019

(65) Prior Publication Data

US 2019/0216097 A1 Jul. 18, 2019

Related U.S. Application Data

(60) Provisional application No. 62/616,640, filed on Jan. 12, 2018.

(51) Int. Cl.
| | | |
|---|---|---|
| *A21C 11/10* | (2006.01) | |
| *B26D 3/24* | (2006.01) | |
| *A21C 15/04* | (2006.01) | |
| *B26D 7/06* | (2006.01) | |
| *B26D 7/32* | (2006.01) | |

(Continued)

(52) U.S. Cl.
CPC .............. *A21C 11/10* (2013.01); *A21C 15/04* (2013.01); *B26D 3/24* (2013.01); *B26D 5/08* (2013.01);
(Continued)

(58) Field of Classification Search
CPC ..... A47J 37/1214; A47J 37/046; A21C 15/00; A21C 9/086; A21C 15/04; A21C 11/006; A21C 11/10; A21C 9/08; A21C 11/00; A21C 11/04; A21C 13/02; A21C 3/022; A21C 9/00; B26D 3/24; B26D 7/0625; B26D 1/40; B26D 2210/04; B26D 5/08; B26D 5/28; B26D 7/01; B26D 7/32; B65G 57/11; B65G 21/2036; B65G 2201/0202; B65G 2203/044; B65G 47/681; B65G 57/035; B65G 59/045; B65G 2201/0205; B65G 23/38; B65G 43/08; B65G 47/082; B65G 47/248; B65G 47/256; B65G 47/52; B65G 47/53; B65G 47/682; B65G 47/71; B65G 47/82; B65G 47/8869; B65G 57/03; B65G 57/04; B65G 57/32
USPC ........... 99/353, 404, 427, 443 C, 407, 450.1, 99/450.2, 349, 355, 395, 423, 448, 489, 99/537; 426/512, 549, 496, 808; 198/406, 433, 689.1, 340, 357, 360, 431,
(Continued)

(56) References Cited

U.S. PATENT DOCUMENTS

| | | | | |
|---|---|---|---|---|
| 2,695,483 A | * | 11/1954 | Toews ........................ | B65B 9/02 53/58 |
| 4,386,490 A | * | 6/1983 | Griffith .................. | B65B 35/405 53/148 |

(Continued)

*Primary Examiner* — Tu B Hoang
*Assistant Examiner* — Vy T Nguyen
(74) *Attorney, Agent, or Firm* — Knobbe, Martens, Olson & Bear, LLP

(57) ABSTRACT

A chip cutting system for use in loading, cutting, and packaging stacks of tortillas. The chip cutting system can include a loader, a vertical loading system, a processing line, a plurality of cutting stations, a sleeving area, an inversion portion, and an output portion.

17 Claims, 14 Drawing Sheets

(51) Int. Cl.
*B65B 5/06* (2006.01)
*B26D 5/08* (2006.01)

(52) U.S. Cl.
CPC ............ *B26D 7/0625* (2013.01); *B26D 7/32* (2013.01); *B65B 5/06* (2013.01); *B26D 2210/04* (2013.01)

(58) Field of Classification Search
USPC ......... 198/440, 464.3, 468.8, 493, 577, 597, 198/601, 704, 713, 803.5, 809, 811, 817, 198/955; 53/553, 559, 204, 209, 244, 53/247, 254, 255, 389.5, 391, 509, 514, 53/526, 572, 58, 74; 83/932, 155, 156, 83/167, 355, 365, 370, 454, 648, 697, 91
See application file for complete search history.

(56) References Cited

U.S. PATENT DOCUMENTS

| | | | | |
|---|---|---|---|---|
| 4,627,215 A | * | 12/1986 | Walz | ............. B65B 5/101 198/346.2 |
| 5,253,762 A | * | 10/1993 | Duncan | ............... A21C 15/00 209/552 |
| 5,494,398 A | * | 2/1996 | Montemayor | ............. A21B 3/07 271/112 |
| 5,687,641 A | * | 11/1997 | Williamson | ............. A21C 3/022 198/689.1 |
| 5,763,861 A | * | 6/1998 | Herrera | ............... G06M 1/101 198/431 |
| 5,918,538 A | * | 7/1999 | Rodriguez | ............. A21C 15/04 99/489 |
| 6,182,424 B1 | * | 2/2001 | Mahood | ............... B65B 25/16 53/241 |
| 6,318,225 B1 | * | 11/2001 | Longoria | ............... A21C 11/10 30/114 |
| 6,585,477 B1 | * | 7/2003 | Lawrence | ............. A21C 9/086 198/597 |
| 2001/0025470 A1 | * | 10/2001 | Straub | ............. B65B 43/52 53/540 |
| 2015/0135921 A1 | * | 5/2015 | Martinez-Montes | ..... A23L 7/13 83/156 |

* cited by examiner

SYSTEM AND METHODS OF CUTTING AND PACKAGING TORTILLAS

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

Field of the Development

Aspects of the present disclosure are directed to the field of automated preparation and packaging of tortilla chips. More specifically, the present disclosure relates to systems and methods for cutting and packaging tortilla chips.

Description of the Related Art

Tortilla chips are a popular type of snack food. Traditionally, tortilla chips are cut from generally round-shaped tortillas, forming chips that have a generally triangular shape with a rounded edge. To produce a high-quality, more authentic tortilla chip, tortillas are typically baked before being cut, packaged, and shipped to customers. The baked, pre-cut tortilla chips are then delivered to restaurants where the chips are fried prior to consumption.

Prior to cutting and packaging, baked tortillas are typically subjected to an equilibration process. The equilibration process allows the moisture in the tortilla to evenly distribute throughout the product. Typically, to conduct the equilibration process, workers manually stack tortillas into boxes to rest for approximately eight hours. The equilibration process is important to high-quality tortilla chip production, as there is a direct relationship between the equilibration process and the desirable hardness and crunch characteristics of tortilla chips. Specifically, the longer the equilibration process, the harder and crunchier the tortilla chips will be after frying.

SUMMARY

The systems, methods, and devices of this disclosure each have several innovative aspects, no single one of which is solely responsible for the all of the desirable attributes disclosed herein.

In one embodiment, a system for cutting and packaging stacked tortillas, comprising: a loader comprising a conveyor having an upper surface for carrying a stack of tortillas, the conveyor configured to move the stack of tortillas from an input end to an output end of the loader, the output end being a transition portion that operatively connects the loader to a remainder of the system; and a product guide, wherein the product guide is configured to receive the stack of tortillas from the transition portion and support the stack of tortillas throughout the remainder of the system, the product guide comprising: separable guide portions, each separable guide portion having a plurality of separated supports; a base, the base having a top surface to support the stack of tortillas; and a product guide engagement mechanism configured to move the separable guide portions toward each other when the stack of tortillas is positioned between the separable guide portions.

In some embodiments, the system includes a vertical lift portion configured to lift the product guide, the base, and the stack of tortillas after the stack of tortillas is enclosed within the product guide and supported by the base.

In some embodiments, the system includes a top conveyer line positioned vertically higher than the loader and configured to receive the product guide and the base from the vertical lift portion, the top line having a top line track which supports the base as it passes along the top line.

In some embodiments, the system includes a cutting station operatively connected to the top line, the cutting station comprising: a blade frame connected to a cutting blade, the cutting blade being oriented along a first cutting plane; a cutting actuator configured to actuate the blade frame and move the cutting blade downward into the stack of tortillas when the stack of tortillas reaches a first cutting position along the top line; and a stack support positioned below the stack of tortillas, the stack support configured to fill the voids between the fork-like members in the base when the stack of tortillas is being cut by the cutting blade, and wherein the stack support meshes with the fork-like members to create a uniform base surface when the stack of tortillas is being cut by the cutting blade, wherein the cutting blade passes between the supports of the product guide when the stack of tortillas is being cut by the cutting blade.

In some embodiments, the system includes a packaging area positioned along the top line and configured to receive the product guide, the base, and the stack of tortillas from the cutting station, wherein packaging is placed over at least a top end of the product guide to enclose the stack of tortillas between the product guide, the base, and the packaging.

In some embodiments, the system includes an inversion conveyor, the inversion conveyor comprising: an inverting surface configured to support the top end of the product guide and the stack of tortillas as the product guide and stack of tortillas rotate around a top line end of the top line and become inverted; a retraction actuator; and a retractable section at the bottom of the inversion conveyor, wherein a packaged stack of cut tortillas falls from the product guide and is supported by the retractable section of the inversion conveyor, and wherein the retraction actuator retracts the retractable section after the stack of tortillas and packaging have fallen from the product guide, thereby allowing the packaged stack of cut tortillas to fall to a discharge line and exit the system.

In some embodiments, the loader includes at least one counting sensor arrangement disposed along the conveyor to detect when each stack of tortillas passes by the counting sensor arrangement.

In some embodiments, the counting sensor arrangement is a beam break sensor arrangement. In some embodiments, a first motor drives the conveyor of the loader and a second motor drives a transition conveyor of the transition portion. In some embodiments, the retractable section has a substantially horizontal surface that supports the packaged stack of cut tortillas prior to the packaged stack of cut tortillas falling to the discharge line.

In some embodiments, the system includes an inversion conveyor end roller, the inversion conveyor end roller being configured to translate toward the inverting surface when the retractable section is moved by the retraction actuator.

In some embodiments, the base further comprises a plurality of fork-like members configured to interleave with and pass the transition portion. In some embodiments, the product guide engagement mechanism comprises a plurality of actuators. In some embodiments, the product guide engagement mechanism comprises a plurality of guide rails. In some embodiments, the product guide and base are operatively connected to a main conveyor.

In an embodiment of a method for cutting and packaging stacked tortillas, the method comprises: loading a stack of tortillas onto a loader, the loader having a conveyor, an input end, and an output end, the output end being a transition portion that is operatively connected to a vertical lift portion; conveying the stack of tortillas along the loader to the transition portion; enclosing the stack of tortillas within a product guide while the stack of tortillas is supported by an upwardly moving base, the product guide comprising a pair of guide portions that move toward one another to enclose the stack of tortillas therein; lifting the stack of tortillas vertically to a top conveying line; moving the stack of tortillas to a cutting location beneath a cutting station, the cutting station comprising a cutting actuator configured to move a cutting blade into the stack of tortillas along a first cutting plane, thereby cutting to the bottom of the stack of tortillas along the first cutting plane; inverting the product guide, the base, and the stack of tortillas while supporting the open end of the product guide on an inverting wall of a conveyor; and retracting a bottom portion of an inversion conveyor after a packaged stack of tortillas falls from the product guide onto the bottom portion of the inversion conveyor, thereby allowing the packaged stack of tortillas to fall to a discharge line.

In some embodiments, the inversion conveyor retracts after the stack of tortillas reaches an end portion of the inversion conveyor, thereby allowing the stacked, packaged tortillas to be output.

In some embodiments, the method includes automatically placing packaging over an open end of the product guide and the stack of tortillas after the cutting station.

Although certain embodiments and examples are disclosed herein, inventive subject matter extends beyond the examples in the specifically disclosed embodiments to other alternative embodiments and/or uses, and to modifications and equivalents thereof.

DETAILED DESCRIPTION

Tortilla chip production involves a sleeve packing process. Once the tortillas are made, they are stacked by workers and then manually loaded into forms or guides. The forms or guides hold the tortilla stacks in place as they are passed through a series of guillotine-type blades of a chip cutting machine. The blades of the chip cutting machine cut each tortilla in the stack into four, six, or eight pieces. After cutting, a bag is placed over the form or guides and the stack of tortillas, and a worker manually inverts the stack and removes the sleeve packaged stack of cut tortilla chips. The packaged sleeves of pre-cut tortilla chips are then shipped to restaurants, where small batches are fried prior to being provided to customers (e.g., restaurant patrons).

The sleeve packing process of tortilla chip production is inadequate for several reasons. Sleeve packing processes known in the art require significant manual labor during the loading and packaging stages in which workers are repetitively exposed to hazardous machinery. For example, common sleeve packing processes require workers to constantly, manually load stacks of tortillas into single piece forms or guides. This traditional manual feeding process requires workers to quickly lower a stack of tortillas into the form or guide, which commonly leads to injuries of workers fingers, hands, and arms. The traditional sleeve packing processes also requires workers to manually invert the stacks of cut, bagged tortillas which is time consuming and unnecessarily strenuous when done repetitively.

Accordingly, there is a need for an improved tortilla chip cutting system that automatically loads tortillas into a cutting process and packages the cut tortilla chips, therefore eliminating the manual labor and hazards of existing chip cutting systems.

Figure 1:
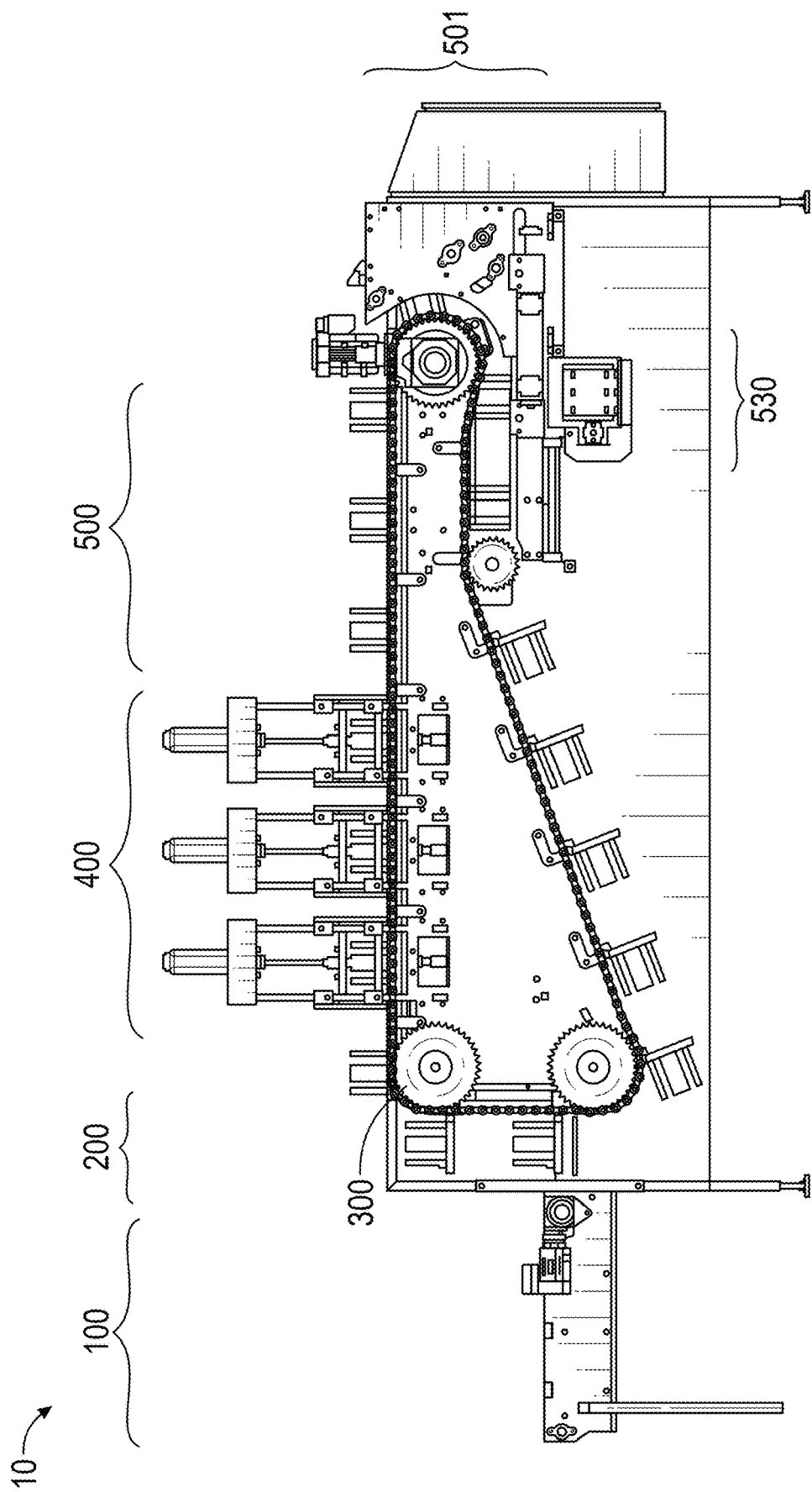
FIG. 1 is a side view of the chip cutting system.
Figure 2:
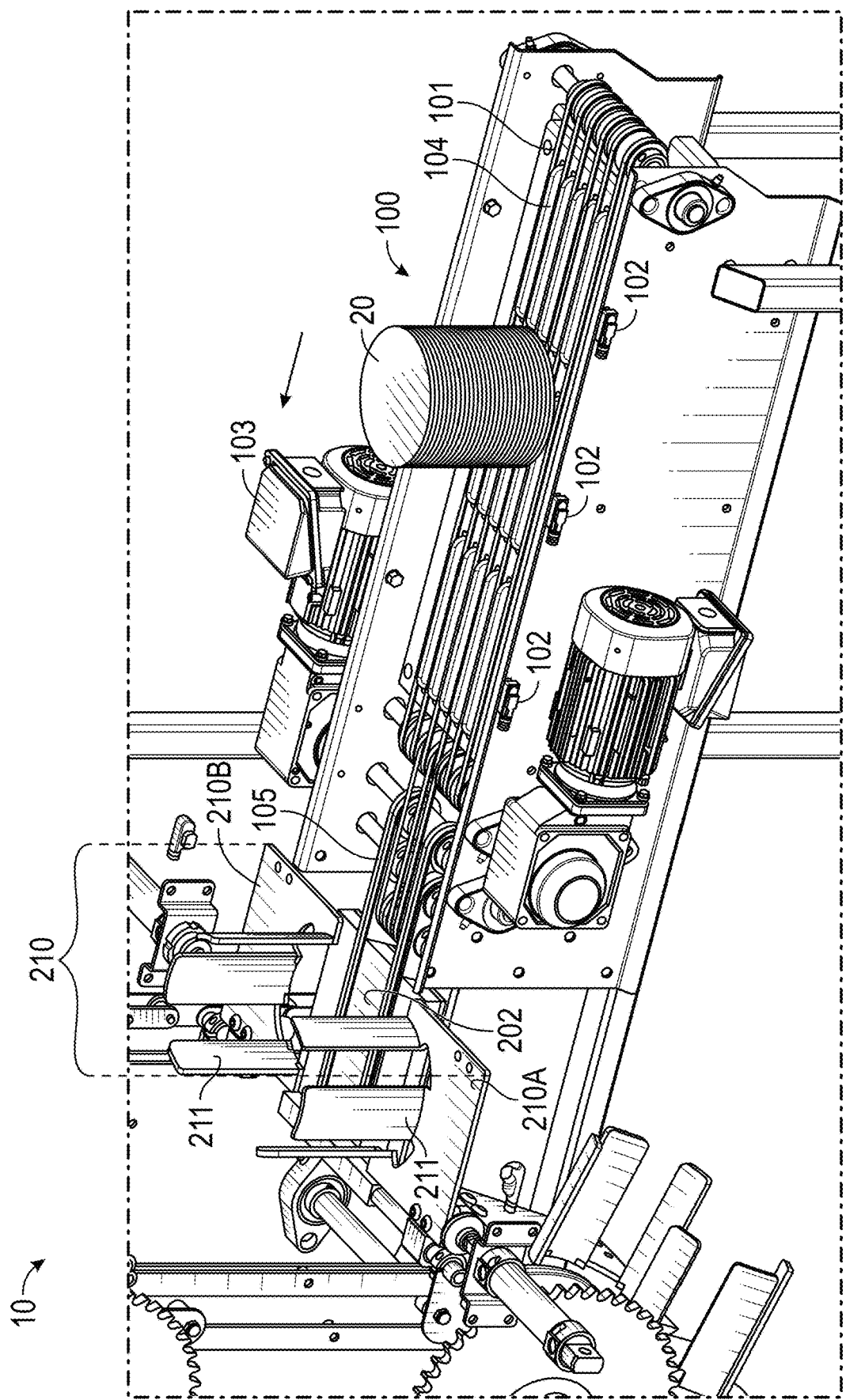
FIG. 2 is a perspective view of a stack of tortillas passing along a loader approaching a product guide according to one embodiment of a chip cutting system.
Figure 3:
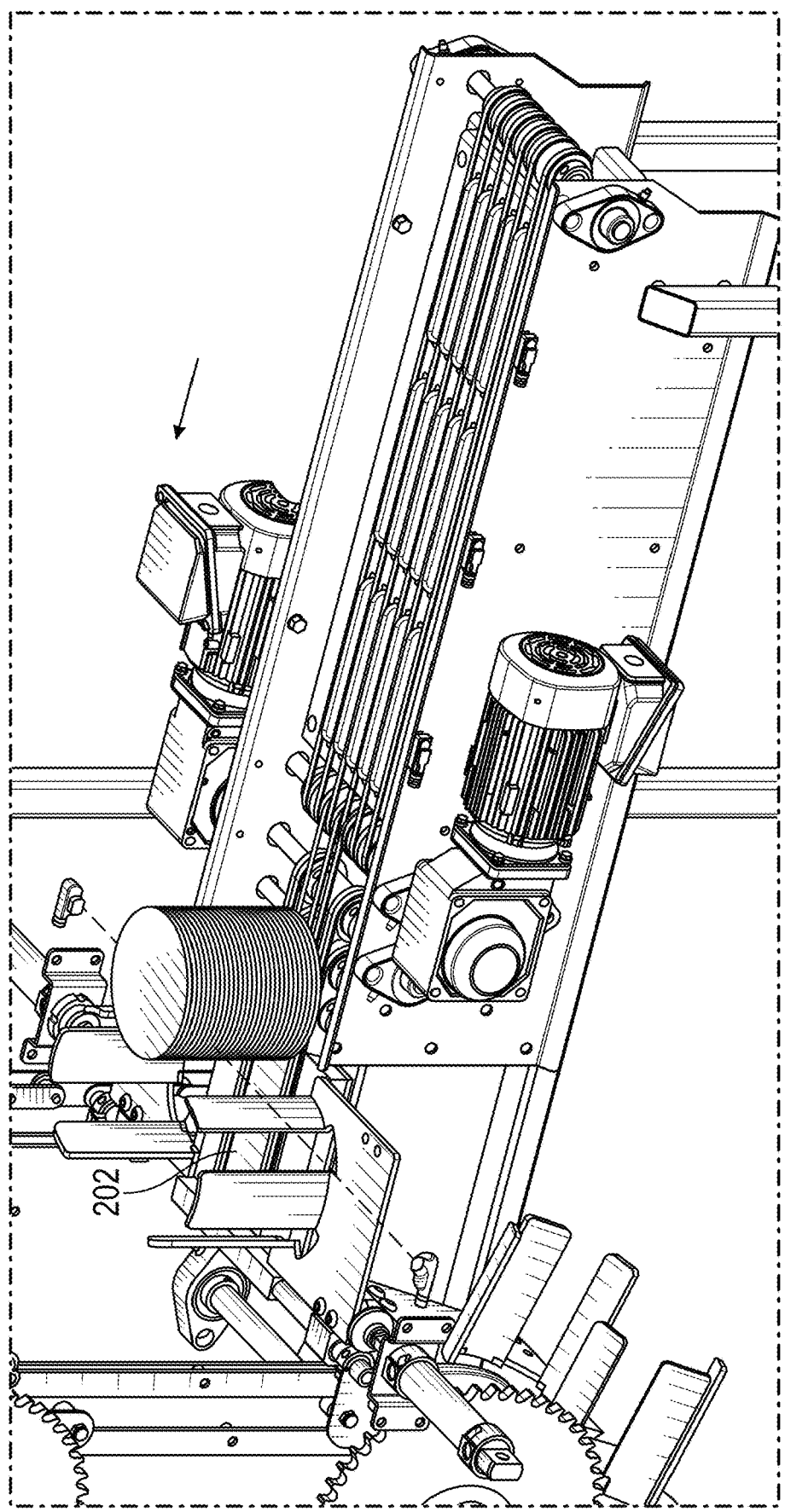
FIG. 3 is a perspective view of the stack of tortillas continuing to approach the product guide of the chip cutting system.

FIGS. 1-14 depicts an embodiment a chip cutting system 10 for use in loading, cutting, and packaging stacks of tortillas 20. FIG. 1 provides a side view of the chip cutting system 10. The chip cutting system comprises a loader 100, a vertical loading system 200, a processing line 300, a plurality of cutting stations 400, a sleeving area 500, an inversion portion 501, and an output portion 530. FIGS. 2-5 depict the product loading process of the system 10. FIGS. 2-3 depict a loader 100 of the system 10. The chip cutting system 10 includes a loader 100, which includes conveying portions 101 in order to receive the incoming stack of tortillas 20. The conveying portions 101 may be driven by electric motors 103. The system 10 may include a conveyor 101 for receiving the incoming stack of tortillas 20.

One or more sensors 102 may be arranged along the loader 100 in order to determine the position of the tortilla stacks 20 on the conveyor 101. The sensors 102 may be a break beam laser, infrared, or other sensor that detect the position of a tortilla stack 20 on the conveyer 101. The loader 100 includes elevating platforms 104. In the illustrated embodiment, there are three loading platforms 101. The loading platforms 104 can lift the stacks off of the banded transfer conveyor, which stops forward movement of the tortilla stacks 20. The tortilla stacks 20 can wait for the chopper to index before being lowered back down and proceeding along the conveyor. The sensors may be configured to count the number of stacks of tortillas 20 that have entered the cutting system 10. By automatically counting the number of stacks of tortillas 20 that have entered the machine, the total number of tortilla chips produced by the system 10 is easily computed. Specifically, each stack of tortillas 20 may have the same number of tortillas, and the product of the number of stacks 20, the numbers of tortillas per stack 20, and twice the number of cuts equals the total number of chips produced by the system 10 per batch.

Figure 4:
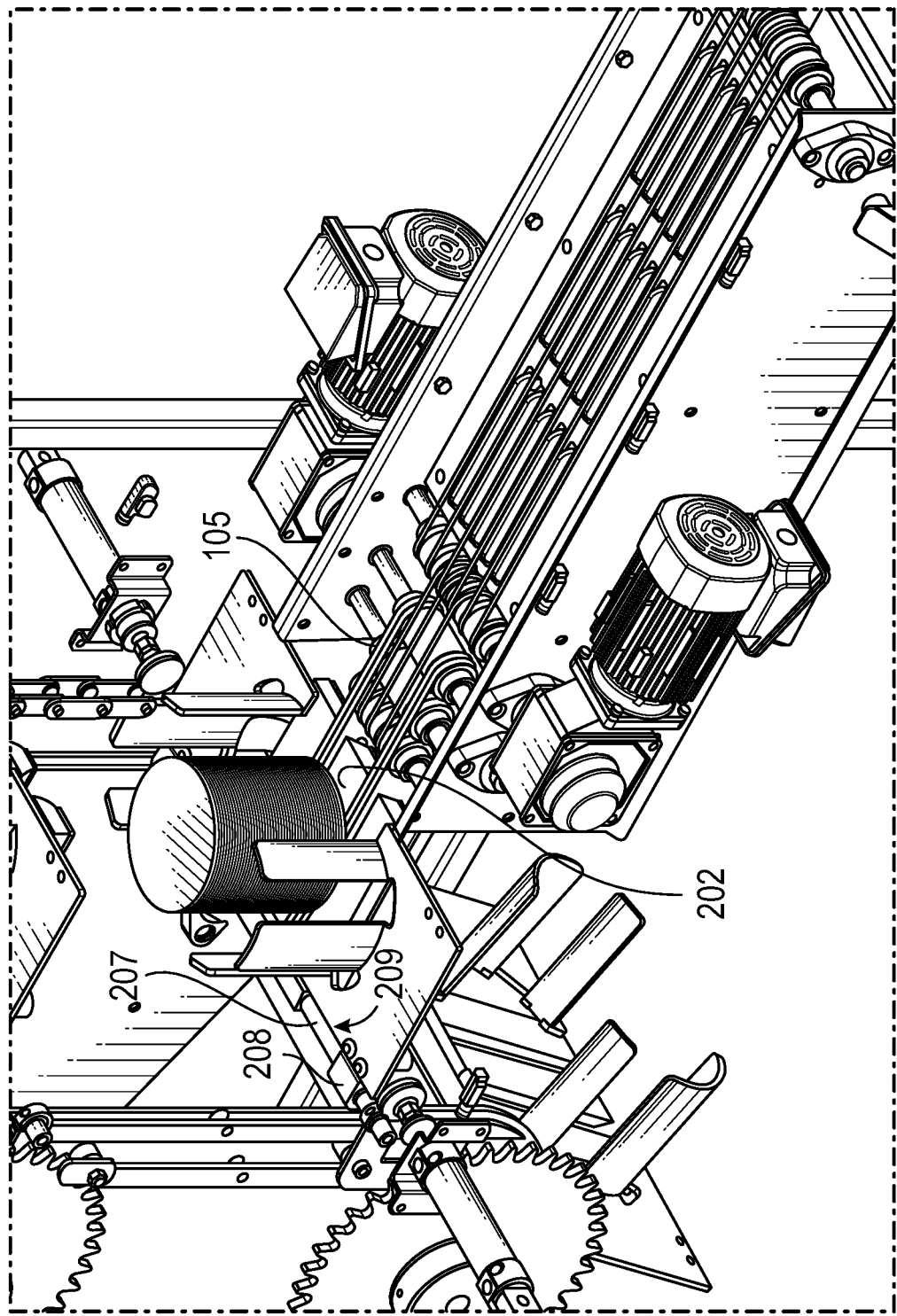
FIG. 4 is a perspective view of the product guide beginning to engage the stack of tortillas.
Figure 5:
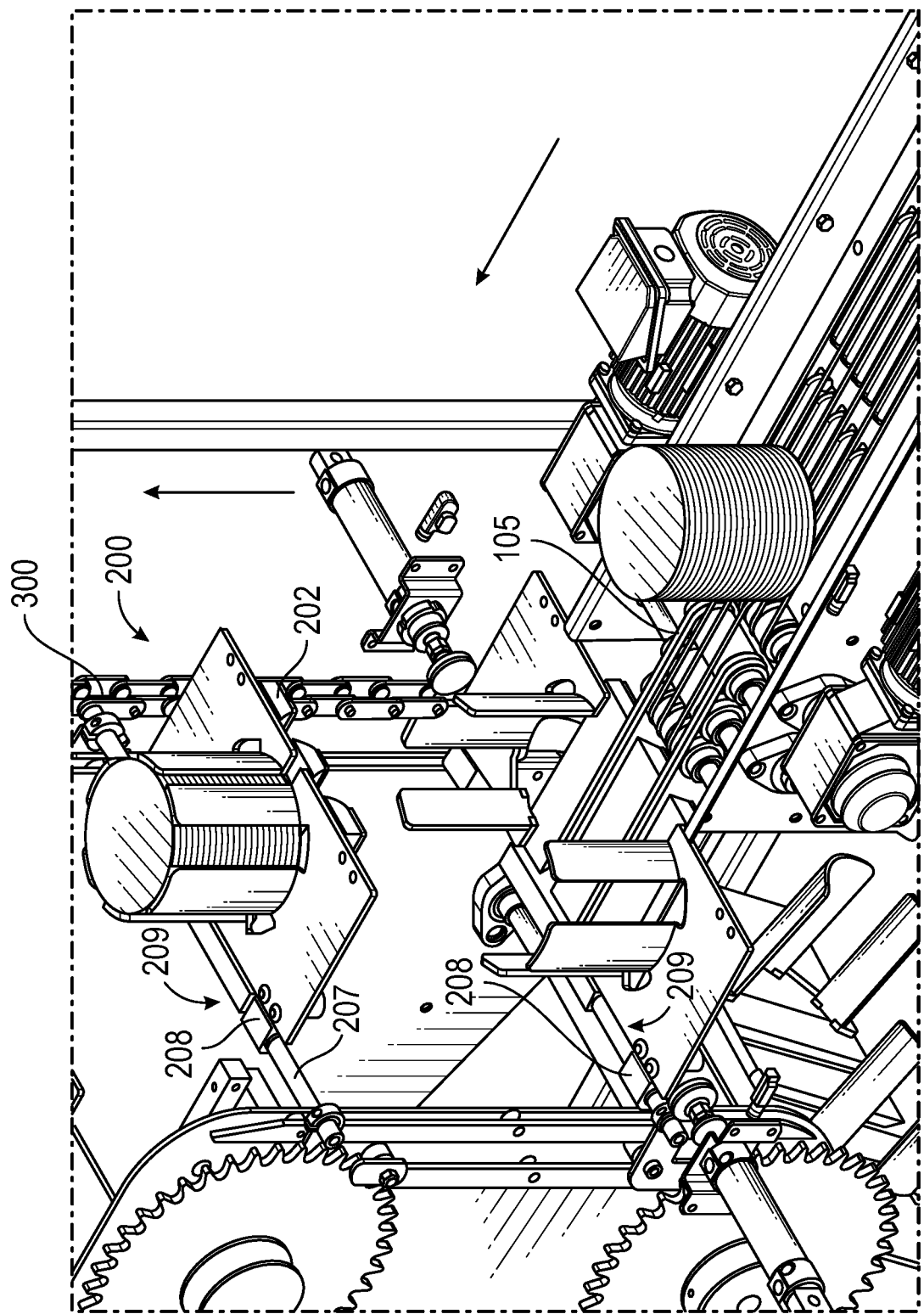
FIG. 5 is a perspective view of the vertical lift portion lifting the product guide and stack of tortillas vertically.

FIGS. 4 and 5 depict a vertical loading system 200 of the system 10. The loader 100 conveys the stack of tortillas 20 along the conveying portions 101 to a product guide 210. The product guide 210 includes two semi-circular guide portions 210A, 210B that include supports 211. The loader 100 conveys the stack of tortillas 20 to a position between the guide portions 210A, 210B. The loader 100 may use an electric motor 104 to convey the stack of tortillas 20 from the loader 100 over the transition portion 105 to a position between the guide portions 210A, 210B. The system 10 includes a plurality of product guides 210 so that stacks of tortillas 20 may be continuously processed by the system 10.

Once the stack of tortillas 20 is conveyed along transition portion 105 and positioned between the guide portions 210A, 210B, the guide portions 210A, 210B are moved toward one another to enclose the stack of tortillas 20 within the product guide 210. The guide portions 210A, 210B may be moved until the guide portions 210A, 210B are adjacent and the stack of tortillas 20 is secured between the supports 211 of the product guide 210. The guide portions 210A, 210B may be moved together using a product guide engagement mechanism 209. In some embodiments, the product guide engagement mechanism 209 is one or more actuators 208 (e.g., an electric motor, pneumatic cylinder, or hydraulic cylinder) that push the guide portions 210A, 210B together and into position around the stack of tortillas 20. In some embodiments, the product guide engagement mechanism 209 is one or more guide rails 207 that move the guide portions 210A, 210B into the enclosed position as the product guides 210 are conveyed through the processing line 300. Optionally, the supports 211 may be constructed of stainless steel such as a food-grade stainless steel. The supports 211 may be coated with polytetrafluoroethylene (e.g., PTFE) in order to help prevent the stack of tortillas 20 from adhering to or depositing a residue upon the supports 211. Advantageously, the two-piece configuration of the product guide 210 allows each stack of tortillas 20 to be automatically loaded without requiring a worker to manually load each stack of tortillas into the product guides 210. Accordingly, use of the two-piece configuration of the product guide 210 enables a faster, more efficient tortilla loading process while eliminating the risks to workers posed by having to manually load stacks of tortillas into the system. Additionally, vertical loading from the loader 100 to the top of the processing line 300 allows for precise positioning of the stacks 20 on the platforms with minimal jostling of the stack 20 during the transfer.

FIG. 5 depicts that, once the stack of tortillas 20 is positioned between the guide portions 210A, 210B, the vertical lift portion 200 provides a base 202 for each stack of tortillas 20 and raises each stack of tortillas 20 in a product guide 210 from the loader 100 to the processing line 300 at the top of the system 10. The vertical lift portion 200 and each product guide 210 may be connected to a main conveyor 300 or processing line. Optionally, the vertical lift portion 200 may be connected to a separate conveyor that lifts each product guide 210 from the loader to one or more cutting stations 400.

The vertical lift portion 200 provides a base 202 upon which each product guide 210 and stack of tortillas 20 sit. Each stack of tortillas 20 is enclosed in a product guide 210 and supported by a base 202 along the processing line at the top of the system 10 until the stack of tortillas 20 has been cut, bagged, and reaches the end of an inversion conveyor 510. The base 202 comprises a plurality of elongate members that may be spaced apart. The base 202 can use any number of elongate members 211 sufficient to support the stack of tortillas 20 throughout the cutting and packaging process. The base 202 is configured have gaps between the elongate members so that the transition conveyors 105 of the loader 100 can pass through without interfering or colliding with the vertical loader 200. Accordingly, the vertical lift portion 200 enables a smooth and efficient transition for the stack of tortilla chips 20 from the loader 100 to the remainder of the cutting system 10, thereby avoiding the disruptive, jarring motion of other systems that transfer tortilla stacks from one conveyor belt to another.

Figure 6:
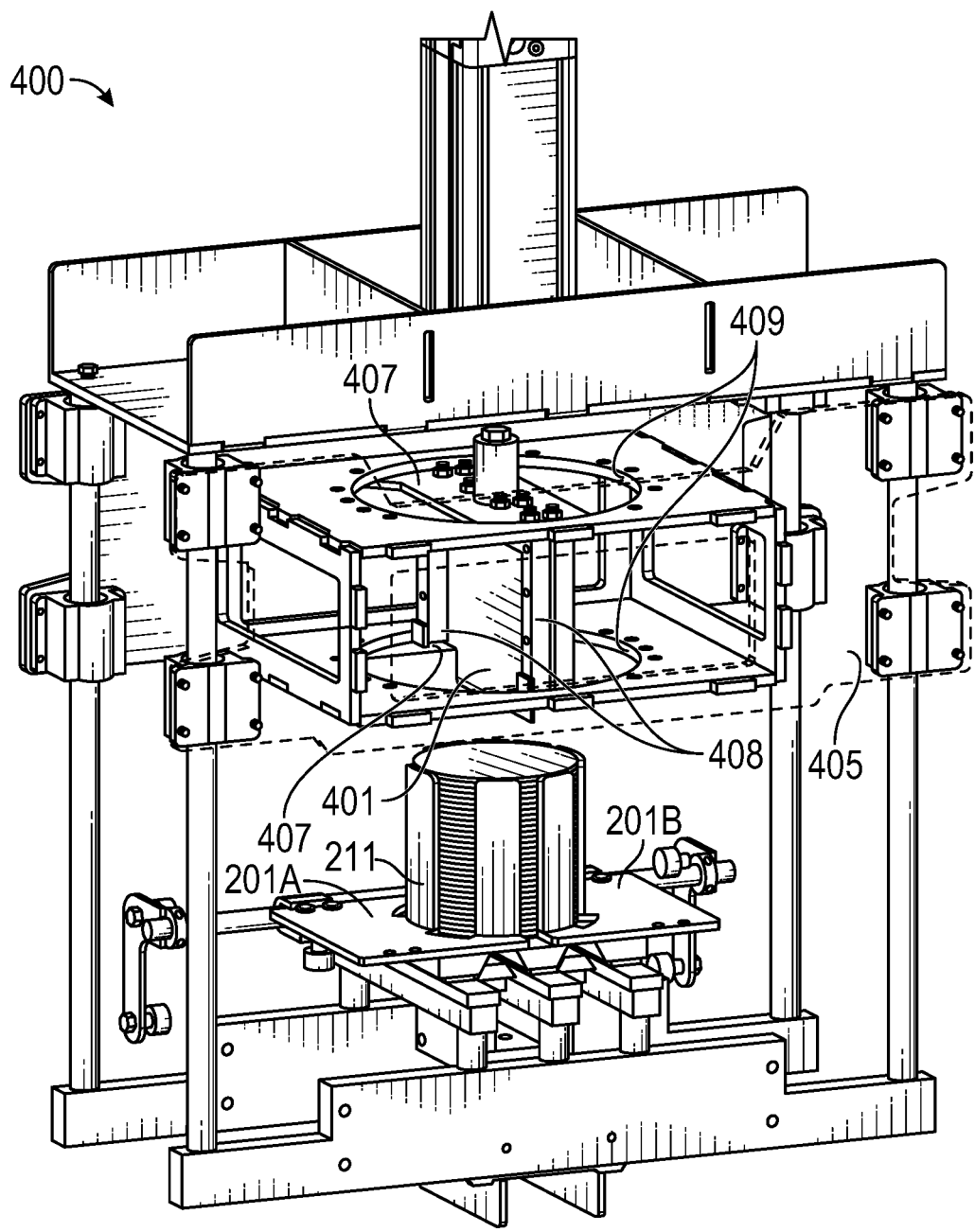
FIG. 6 is a perspective view of a cutting station prior to cutting the stack of tortillas received from the vertical lift portion and the loader.

After the stack of tortillas 20 has been lifted by the vertical lift portion 200 to the processing line 300, the stack of tortillas 20 is subjected to the cutting process of the system 10. FIG. 6-9 depict the cutting process of the system 10. FIG. 6 depicts a cutting station 400 of chip cutting system 10. The cutting system 10 includes one or more cutting stations 400 in order to cut each tortilla into the desired number of pieces (e.g., chips). Each cutting station 400 includes a cutting blade 401 held by a blade frame 405. The blade frame 405 may include a pair of cutting blade guides 408 and a cutting blade adjustment member 407 at respective top and bottom ends of the cutting blade guides 408. The cutting blade 401 is secured between the cutting blade guides 408 which reinforce the cutting blade 401 to reduce the blade deflection (e.g., blade drift) that would otherwise occur when cutting the stack of tortillas 20. The cutting blade guides 408 may be connected to the cutting blade adjustment members 407 by fasteners or other suitable removable connection mechanism. The cutting blade adjustment members 407 may be connected to connection points arranged around the blade frame openings 409 of the blade frame 405. For example, the cutting blade adjustment members 407 may be connected to the blade frame 405 by fasteners, mechanical interlock, or other suitable removable connection mechanism (e.g., a nut and bolt arrangement). Optionally, the cutting blade adjustment members 407 may be rotated relative to the blade frame 405. The blade frame 405 can be actuated by a piston, electric motor, or similar device in order to drive the frame 405 and cutting blade 401 downward along the blade frame supports 406 in order to cut the stack of tortillas 20. Optionally, the cutting blade 401 may be an ultrasonic cutting blade 401 that vibrates to reduce the frictional forces between the blade 401 and the stack of tortillas 20.

Figure 7:
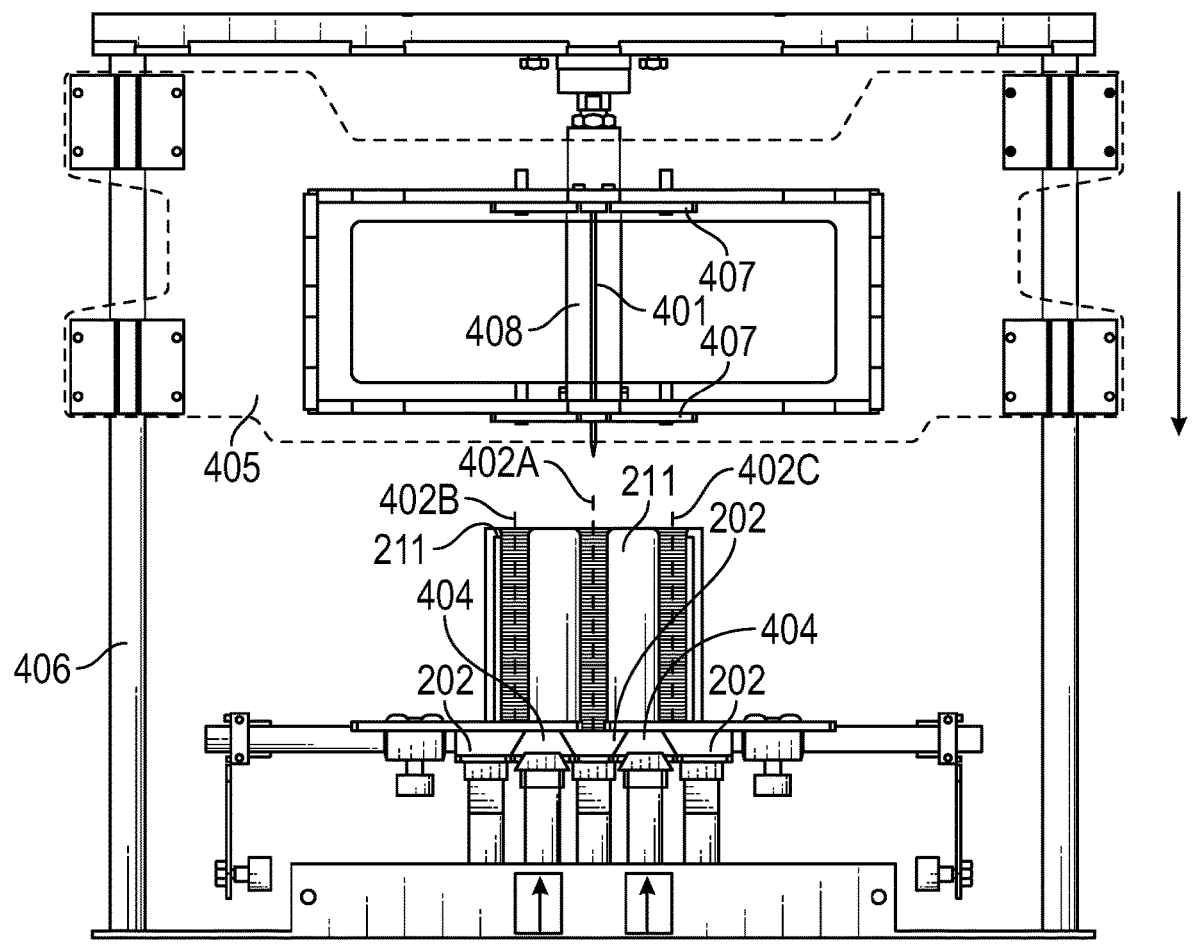
FIG. 7 is a side view of the cutting station of FIG. 6 prior to cutting the stack of tortillas received from the vertical lift portion and the loader.

In FIG. 7, the cutting blade 401 is oriented along a first cutting plane 402A, which may be positioned between supports 211 of the product guide 210. The separation between the supports 211 of the product guide 210 allow the stack of tortillas 20 to be cut along a different cutting plane by other cutting stations. For example, the separation between each opposing pair of supports 211 allow another cutting blade 401 to cut the stack of tortillas along different cutting planes. In the illustrated embodiment, there are three cutting planes 402A-C producing a six-way cut and three corresponding cutting stations. In some embodiments, the cutting station may include a dual-plane cutting blade 401 in order to simultaneously cut along multiple cutting planes.

In other embodiments, the cutting planes may be adjusted in order to produce a different cut (e.g., a four-way cut) in the stack of tortillas 20. To adjust the cutting planes, the fasteners securing the cutting blade adjustment members 407 to the blade frame 405 are removed. The cutting blade adjustment members 407 may then be removed (e.g., lowered) from the blade frame 405, rotated with respect to the blade frame 405, and then reattached to the blade frame 405 using the fasteners at other connection points disposed around the blade frame openings 409. In this way, the cutting blade adjustment members 407, the cutting blade guides 408, the cutting blade 401, and the cutting plane may be rotated relative to the blade frame 405. To produce a four-way cut in a system 10 with three cutting stations 400, the cutting blades 401 of the first two cutting stations 400 may be rotated using the procedure described above, such that the cutting plane 402A is orthogonal to the cutting plane 402B. The first two cutting stations 400 would then be used in the cutting process while the third cutting station 400 would not be used, because the four-way cut is achievable through the use of only two cutting stations 400.

Figure 8:
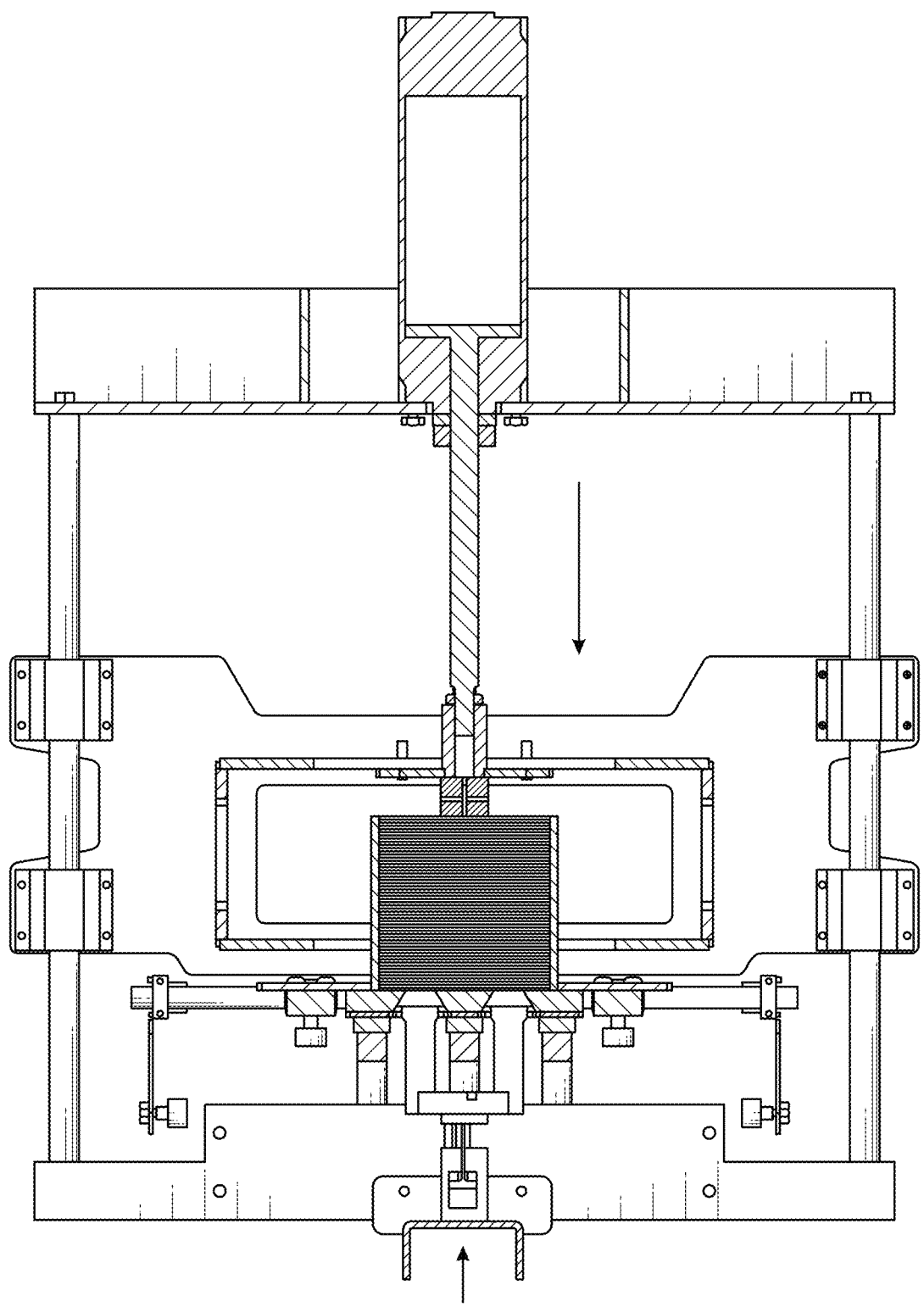
FIG. 8 is a side view of the cutting station of FIG. 6 after a cutting element has cut through the stack of tortillas along a first cutting plane.
Figure 9:
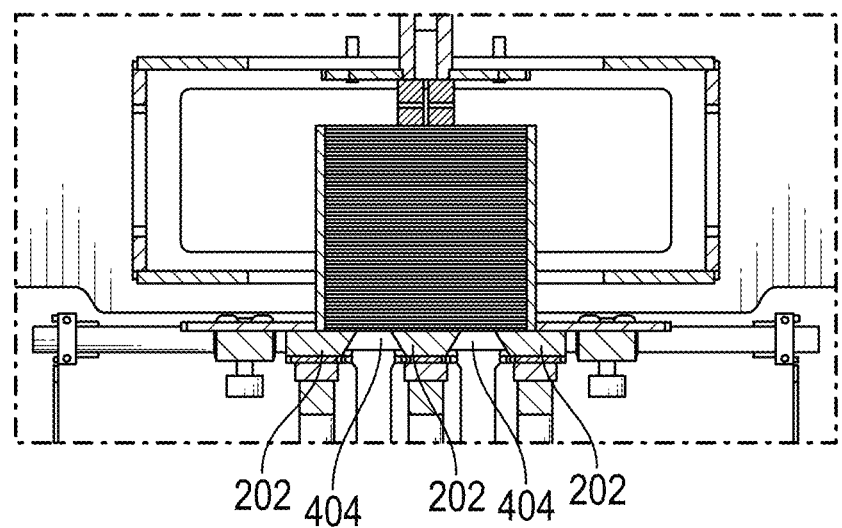
FIG. 9 is an enlarged side view of the cutting station illustrated in FIG. 8.

FIGS. 7-9 depict a side view of cutting station 400. The cutting station 400 includes one or more stack supports 404 which fill the voids between each of the portions of the base 202, thereby creating a uniform supported base that supports the stack of tortillas 20. The stack supports 404 may be present along the entire processing line 301 or along the portion of the processing line 301 associated with cutting stations 400. The stack supports 404 may be raised when the blade frame 405 is actuated, in preparation for contact between the cutting blade 401 and the stack of tortillas 20.

As the blade frame 405 is actuated and cutting blade 401 presses into the stack of tortillas, the cutting blade 401 imposes a pressure upon the stack of tortillas 20. Without a uniform supported base, it would be more difficult for the cutting blade 401 to cut all the way to the bottom of the stack of tortillas 20. The lack of a uniform supported base could result in the blade 401 failing to cut one or more tortillas at the bottom of the stack of tortillas 20. FIGS. 8-9 illustrate that the cutting system 10 is able to cut uniformly through the entire stack of tortillas 20. Advantageously, the pressure imposed on the stack of tortillas 20 during the cutting process is uniformly distributed upon the stack supports 404 and members of the base 202, which allows the cutting blade 401 to cut cleanly through the stack of tortillas 20 to the base 202, thereby resulting in improved cutting consistency. The end position of the cutting blade 401 may also be precisely defined by a user of the system 10 to ensure that the cutting blade 401 cuts through the stack of tortillas 20 to the base 202. Optionally, the base 202 may be formed of an ultra-high molecular weight polyethylene (e.g., UHMWPE) or another thermoplastic polyethylene that will not blunt the cutting blade 401 when the cutting blade 401 contacts the base 202. The base 202 may be a consumable, easily replaceable component of the system 10.

Figure 10:
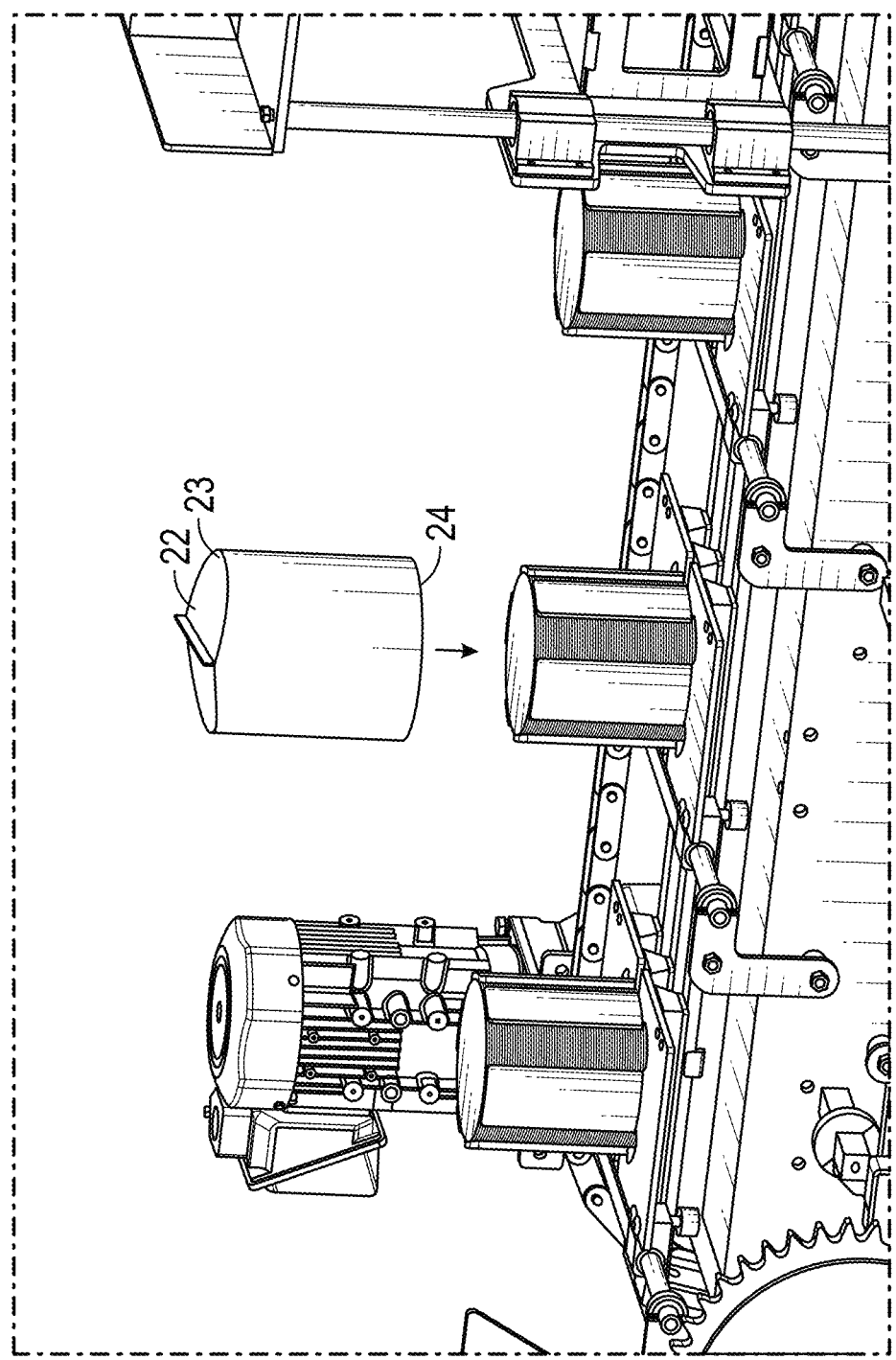
FIG. 10 is a perspective view of packaging being placed over the stack of tortillas and product guide after the stack has passed through one or more cutting stations.

Once the stack of tortillas 20 has passed through the cutting process of the one or more cutting stations 400, the stack of cut tortillas 20 passes through the sleeving area 500 of the system 10. FIG. 10 depicts the sleeving process of the system 10. In the sleeving area 500, packaging 22 (e.g., a bag, sleeve, wrapper, or box) is placed over the stack of cut tortillas 20 and the product guide 210 such that the stack of cut tortillas 20 is enclosed by the packaging 22 to become a packaged stack 21. The sleeving process can be automated or performed manually. The automated sleeving process may include a mechanical arm that contains a supply of packaging 22 and includes motors or actuators in order to open the packaging 22 and place the packaging 22 over the stack of cut tortillas 20. The manual sleeving processing includes a worker placing packaging 22 over each stack of cut tortillas 20 as it exits the cutting process of the system 10.

Figure 11:
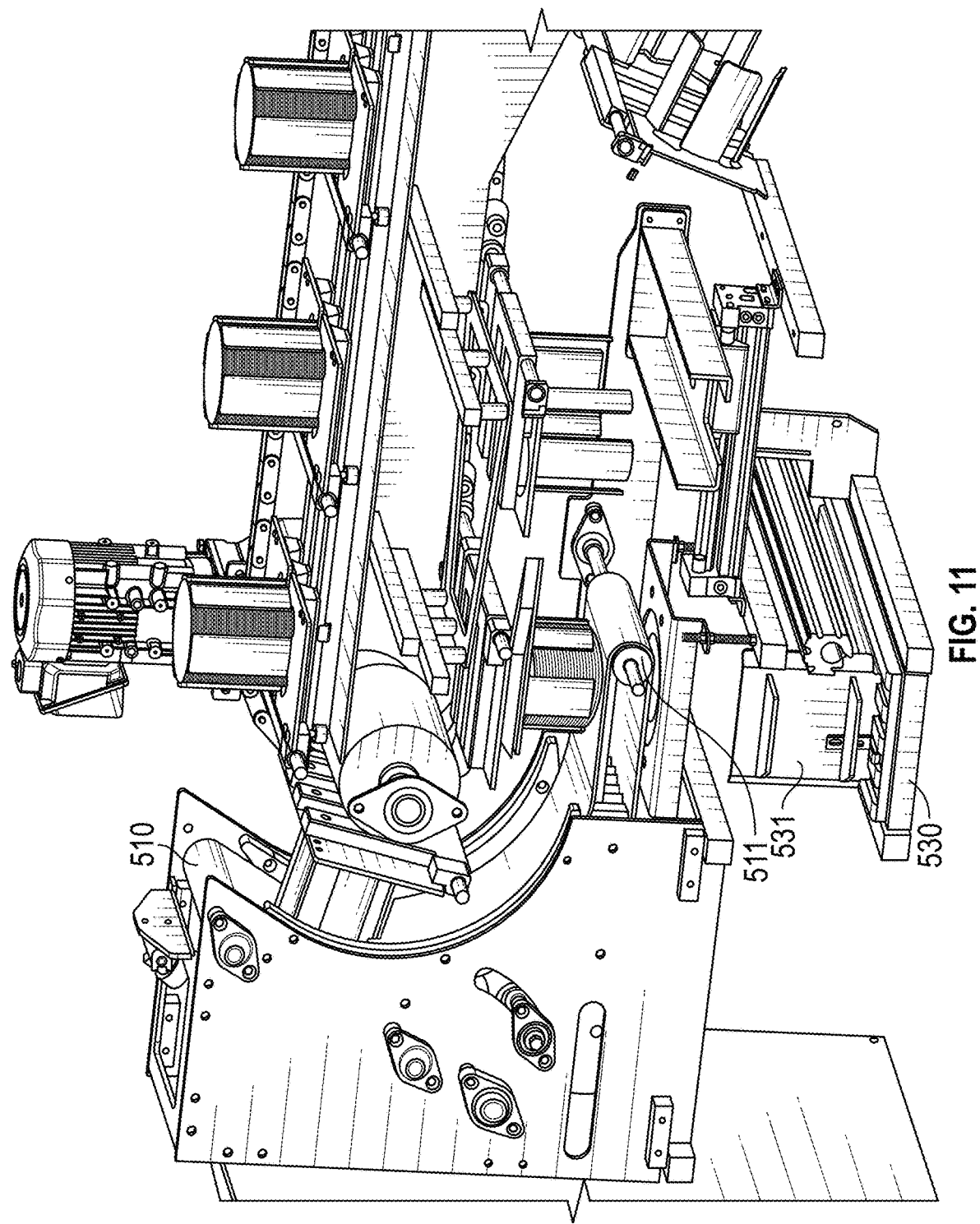
FIG. 11 is a perspective view of the cut, packaged stack of tortillas passing along an inversion conveyor of the chip cutting system.
Figure 12:
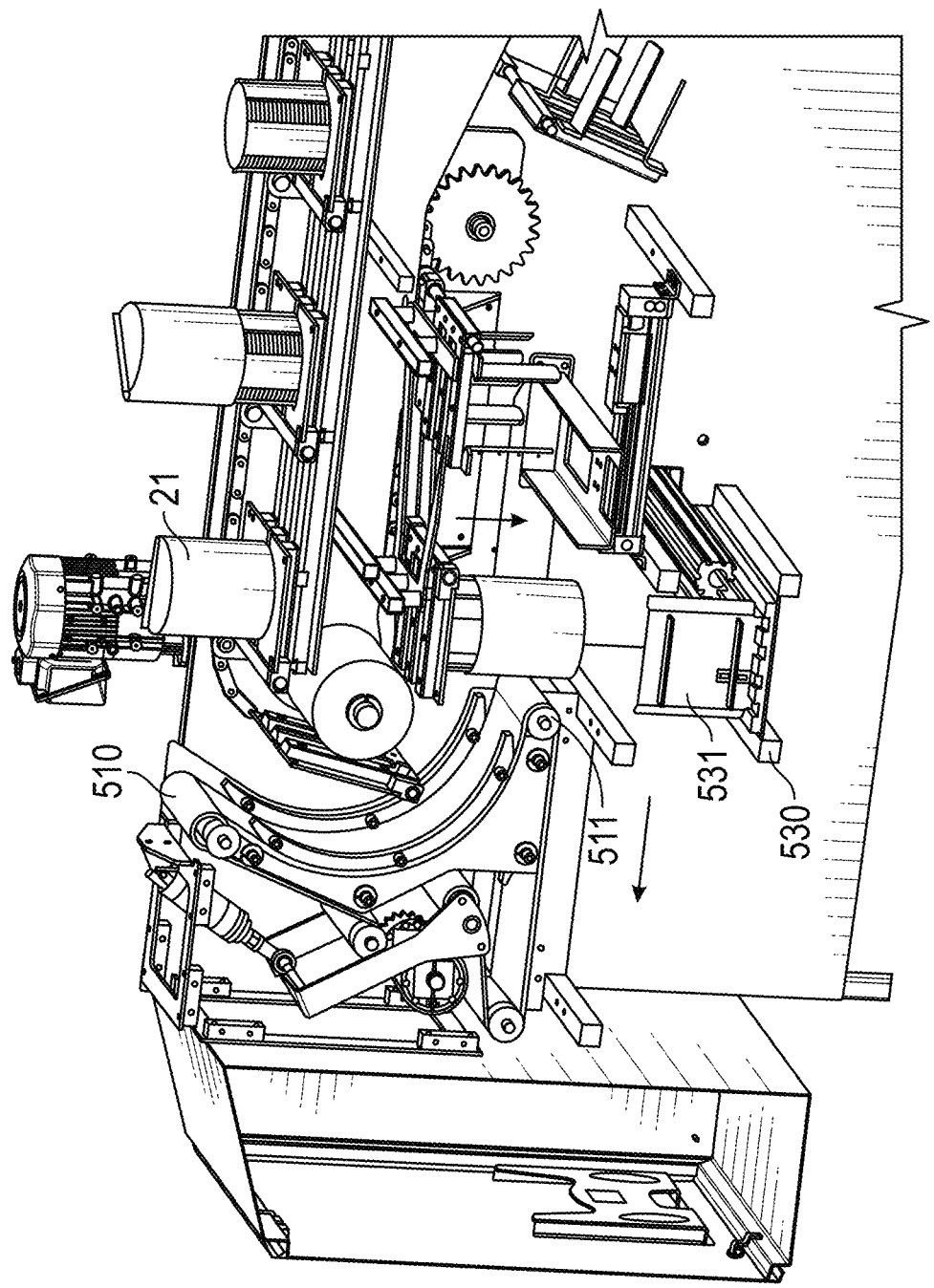
FIG. 12 is a perspective view of the cut, packaged stack of tortillas falling from the product guide after the inversion conveyor has retracted.

After passing through the sleeving area 500, the packaged stack 21 enters the inversion portion 501 of the system 10. FIGS. 10-12 depict the inversion portion 501 of the system 10. The inversion portion 501 includes an inversion conveyor 510 which is generally C-shaped. The inversion conveyor 510 covers the exposed end of the packaged stack 21 as the packaged stack 21 is inverted. At the bottom of the inversion conveyor 510, the open end 24 of the packaged stack 21 facing upward, while the bottom end 24 of the packaged stack 21 sits upon the inversion conveyor 510. Advantageously, the inversion conveyor 510 allows the packaged stack 21 to be inverted automatically which improves the efficiency of the system while eliminating the risk of product becoming deformed or dropped during the inversion process.

FIG. 11 depicts that as the packaged stack 21 enters the inversion conveyer 510, the base 202, product guide 210, and packaged stack 21 may rotate about an end portion (e.g., an end motor or roller) of the processing line 300. The base 202, product guide 210, and packaged stack 21 rotate about the end portion while maintaining contact between the bottom end 24 of the packaged stack 21 and the inversion conveyor 510 to ensure that the packaging 22 and/or cut tortillas do not prematurely fall out of the product guide 210.

Figure 13:
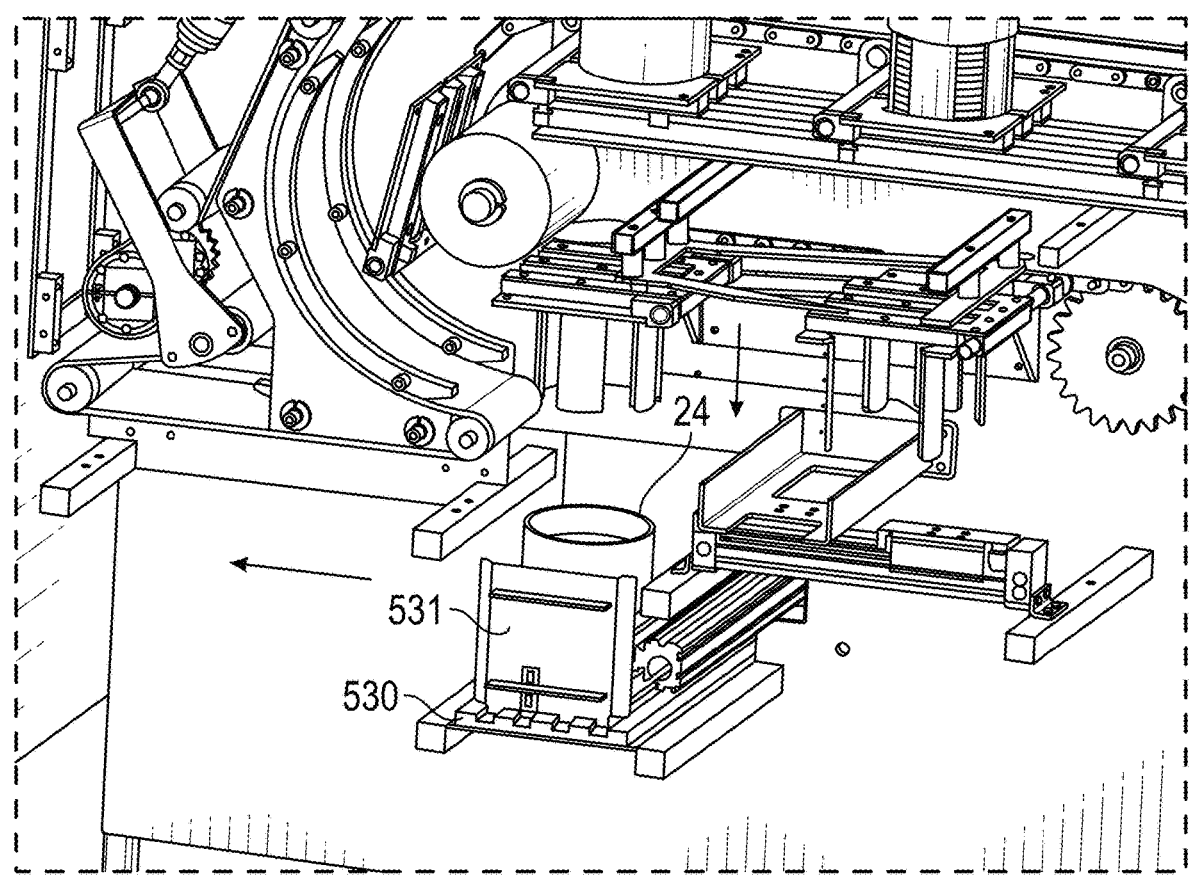
FIG. 13 is a perspective view of the cut, packaged stack of tortillas positioned on a discharge portion of the chip cutting system.

FIG. 11 depicts the end portion of the inversion conveyor 510 in a first configuration, in which the end roller 511 of the inversion conveyor 510 is extended outward to receive the packaged stack 21. Once the packaged stack 21 reaches the end of the inversion conveyor 510 in its first configuration, the inversion conveyor 510 is actuated and moved into a second configuration. FIGS. 12-13 illustrate the second configuration of the inversion conveyer 510, where actuation of an actuator (e.g., an electric motor, pneumatic cylinder, or hydraulic cylinder) causes the end roller 511 to retract. In the second configuration, the end portion 511 of the inversion conveyor 510 that was supporting the packaged stack 21 is retracted, allowing the packaged stack 21 to fall from the product guide 210 to the output portion 530 of the system 10.

FIGS. 12-13 depict the packaged stack 21 falling from the product guide 210 to the output portion 530 after the end portion of the inversion conveyor 510 has been actuated and moved into its retracted second configuration. Advantageously, the packaged stack 21 falls to the output portion 530 due to gravity, which saves power and eliminates the need for manual labor to remove the finished product from the system. The packaged stack 21 falls enough to become separated from the product guide 210. The packaged stack 21 is caught or received by the output portion 530 of the system 10.

Figure 14:
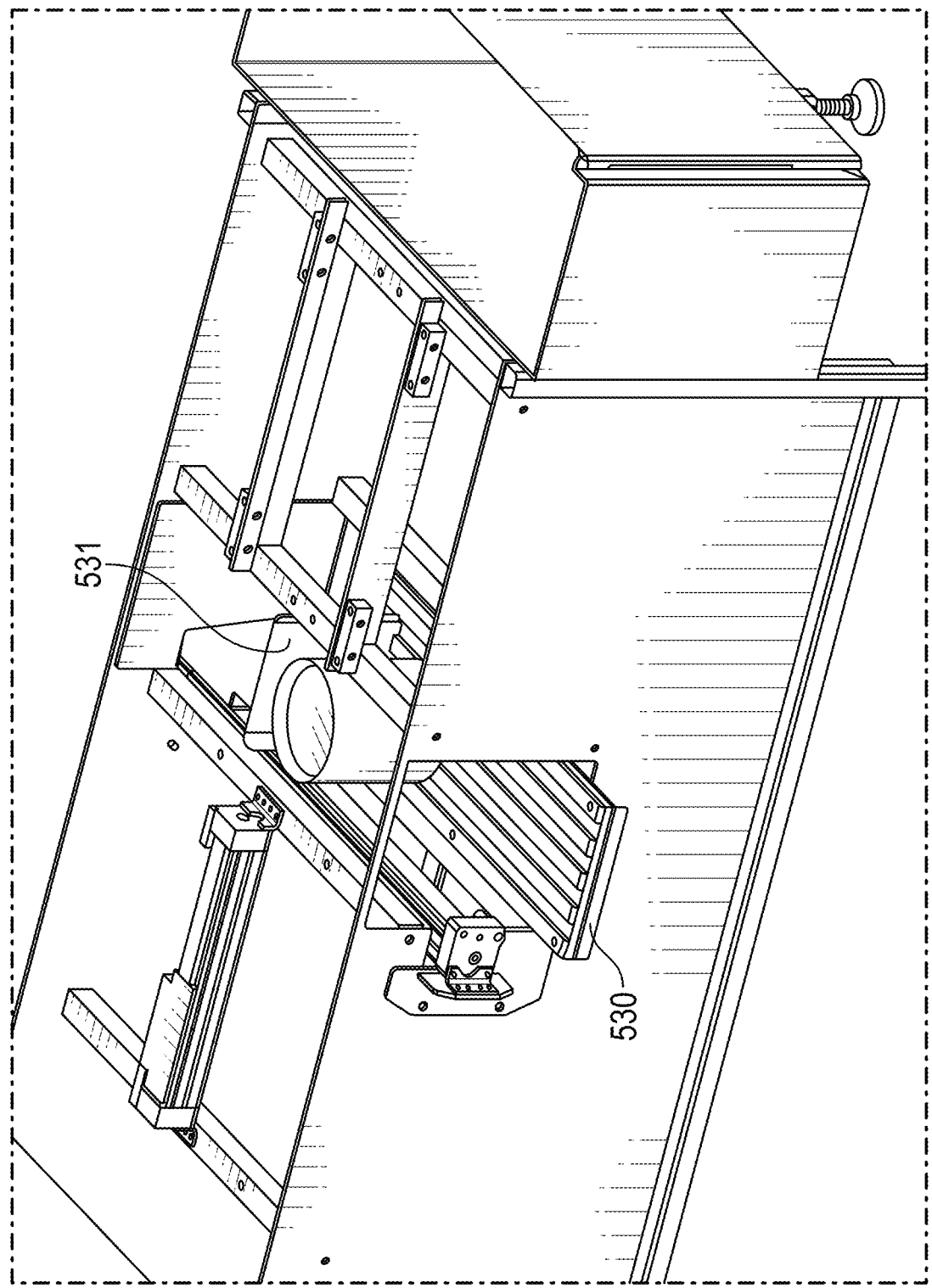
FIG. 14 is a perspective view of the cut, packaged stack of tortillas passing being moved by a discharge arm to a waiting conveyor (not shown).

FIGS. 12-14 illustrate the output portion 530 of the system 10. The output portion 530 includes a discharge line and a discharge conveyor or arm 531. The packaged stack 21 falls onto or is otherwise received by the discharge line 530, such that the open end 24 of the packaged stack 21 is facing upward. The discharge conveyor or arm 531 can then be actuated by an actuator (e.g., an electric motor, pneumatic cylinder, or hydraulic cylinder), which moves the discharge conveyor or arm 531 against the packaged stack 21 and pushes or slides the packaged stack out of the system 10 to an output conveyor or output receiving area for additional packaging or processing. Optionally, one or more of the sleeving areas 500, the inversion portion 501, or the output portion 530 of the system 10 may be eliminated such that the stack of tortillas 20 passes through the cutting process of the one or more cutting stations 400 and is then output to a bulk receptacle or transported (e.g., by conveyor belt, vacuum, or other conveying means) away from the system 10 for additional processing or packaging.

In the above detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

In those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for cutting and packaging stacked tortillas, comprising:

a loader comprising a conveyor having an upper surface for carrying a stack of tortillas, the conveyor configured to move the stack of tortillas from an input end to an output end of the loader, the output end being a transition portion that operatively connects the loader to a remainder of the system;
a product guide, wherein the product guide is configured to receive the stack of tortillas from the transition portion and support the stack of tortillas throughout the remainder of the system, the product guide comprising:
separable guide portions, each separable guide portion having a plurality of separated supports;
a base, the base having a top surface to support the stack of tortillas; and
a product guide engagement mechanism configured to move the separable guide portions toward each other when the stack of tortillas is positioned between the separable guide portions;
a vertical lift portion configured to lift the product guide, the base, and the stack of tortillas after the stack of tortillas is enclosed within the product guide and supported by the base;
a top conveyor line positioned vertically higher than the loader and configured to receive the product guide and the base from the vertical lift portion, the top conveyor line having a top line track which supports the base as the base passes along the top conveyor line; and
a cutting station operatively connected to the top conveyor line, the cutting station comprising:
a blade frame connected to a cutting blade, the cutting blade being oriented along a first cutting plane;
a cutting actuator configured to actuate the blade frame and move the cutting blade downward into the stack of tortillas when the stack of tortillas reaches a first cutting position along the top line; and
a stack support positioned below the stack of tortillas, the stack support configured to fill voids between fork-like members of the base when the stack of tortillas is being cut by the cutting blade, and wherein the stack support meshes with the fork-like members to create a uniform base surface when the stack of tortillas is being cut by the cutting blade, wherein the cutting blade passes between supports of the product guide when the stack of tortillas is being cut by the cutting blade.

2. The system of claim 1 further comprising a packaging area positioned along the top line and configured to receive the product guide, the base, and the stack of tortillas from the cutting station, wherein packaging is placed over at least a top end of the product guide to enclose the stack of tortillas between the product guide, the base, and the packaging.

3. The system of claim 1 further comprising an inversion conveyor, the inversion conveyor generally C-shaped and comprising:
an inverting surface configured to support a top end of the product guide and the stack of tortillas as the product guide and stack of tortillas rotate around an end of the top line track and become inverted;
a retraction actuator; and
a retractable section at the bottom of the inversion conveyor, wherein a packaged stack of cut tortillas falls from the product guide and is supported by the retractable section of the inversion conveyor, and wherein the retraction actuator retracts the retractable section after the stack of tortillas and packaging have fallen from the product guide, thereby allowing the packaged stack of cut tortillas to fall to a discharge line and exit the system.

4. The system of claim 3, the loader further comprising at least one counting sensor arrangement disposed along the conveyor to detect when each stack of tortillas passes by the counting sensor arrangement.

5. The system of claim 4, wherein a counting sensor arrangement of the at least one counting sensor arrangement is a beam break sensor arrangement.

6. The system of claim 1, wherein a first motor drives the conveyor of the loader and a second motor drives a transition conveyor of the transition portion.

7. The system of claim 3, wherein the retractable section has a substantially horizontal surface that supports the packaged stack of cut tortillas prior to the packaged stack of cut tortillas falling to the discharge line.

8. The system of claim 3, further comprising an inversion conveyor end roller, the inversion conveyor end roller being configured to translate toward the inverting surface when the retractable section is moved by the retraction actuator.

9. The system of claim 1, wherein the fork-like members of the base are configured to interleave with and pass the transition portion.

10. The system of claim 1, wherein the product guide engagement mechanism comprises a plurality of actuators.

11. The system of claim 1, wherein the product guide engagement mechanism comprises a plurality of guide rails.

12. The system of claim 1, wherein the product guide and base are operatively connected to a main conveyor.

13. The system of claim 3, wherein the inversion conveyor prevents or reduces the likelihood of each stack of tortillas becoming deformed or dropped during inversion process.

14. The system of claim 1, wherein the base is formed of thermoplastic polyethylene such that the base does not blunt the cutting blade when the cutting blade contacts the base.

15. The system of claim 1, wherein the cutting blade imposes pressure upon the stack of tortillas being cut, and wherein the pressure imposed on the stack of tortillas during the cutting process is distributed upon the stack supports and the fork-like members of the base.

16. The system of claim 1, wherein the stack supports are raised when the blade frame is actuated, in preparation for contact between the cutting blade and the stack of tortillas.

17. The system of claim 3, wherein the inversion conveyor covers an exposed end of the packaged stack of tortillas as the packaged stack of tortillas is inverted.

* * * * *